United States Patent [19]
Kakigi

[11] 4,095,183
[45] June 13, 1978

[54] TUNING CIRCUIT
[75] Inventor: Takao Kakigi, Inagi, Japan
[73] Assignee: Cybernet Electronic Corporation, Kanagawa, Japan
[21] Appl. No.: 762,281
[22] Filed: Jan. 25, 1977
[51] Int. Cl.² ............................................. H04B 1/54
[52] U.S. Cl. ...................................... 325/17; 325/421
[58] Field of Search ................ 325/17, 25, 63, 184, 325/421, 422, 45, 145; 343/179; 331/10, 11; 332/16 R, 30 R, 30 V

[56] References Cited
U.S. PATENT DOCUMENTS
3,153,194 10/1964 Orwin et al. ............................. 325/25
3,413,554 11/1968 Yates et al. ............................. 325/17

*Primary Examiner*—Benedict V. Safourek
*Attorney, Agent, or Firm*—Oblon, Fisher, Spivak, McClelland & Maier

[57] ABSTRACT

A tuning circuit suitable for use in a transmitter-receiver of the phase locked loop frequency synthesizing type which has two separate variable-capacity elements, one for the follow-up control of the phase locked loop and the other for shift and modulation, arranged in parallel with an inductor of an oscillation circuit and adapted to be energized by a DC power supply through a transmission-and-reception change-over switch.

3 Claims, 5 Drawing Figures

TUNING CIRCUIT

BACKGROUND OF THE INVENTION

The present invention relates to a tuning circuit especially suitable for use in a transmitter-receiver of the phase locked loop frequency-synthesizing type in which a shift of the tuning point corresponding to the intermediate frequency of the receiver unit is achieved interacting with the switching action from reception to transmission.

In a usual transmitter-receiver which uses at least a phase locked loop and which utilizes the controlled output frequency of the voltage-controlled oscillator as the local oscillation frequency for the receiver to produce an intermediate frequency and also as the carrier frequency of the transmitter, it is a well-known practice that, in order to form a system in which a frequency equivalent to the intermediate frequency is made to shift when reception is switched to transmission, phase locked loops are provided separately for transmission and reception in the high-frequency region such as UHF and VHF so that one of the loops may control the other. However, this system inevitably involves a complicated circuit and high cost when put into practical use, though it can obtain accurate frequency phase synchronization. In addition, when the frequency band is increased from 27 MHz to 540 MHz, the requirements that the voltage-controlled oscillator of the phase locked loop must satisfy becomes very severe; and it is practically impossible to obtain such circuit parts as can satisfy the above-mentioned requirements. Moreover, the voltage applied to the variable-capacity element for use in the frequency phase follow-up control of the phase locked loop varies with the channel, and therefore cannot be modulated.

SUMMARY OF THE INVENTION

For the reasons mentioned above, the inventor has studied a system having an variable-capacity element for use exclusively in the control of the phase locked loop and another variable-capacity element for use in shift and modulation. As a result, it has been found that this system can achieve accurate frequency follow-up control, easy operation and economy with only a slight fine adjustment, since modulation can be applied to the parts where the voltage does not vary with the channel unlike the conventional system when a shift is applied to the voltage-controlled oscillator by a voltage equivalent to the intermediate frequency during the change-over between reception and transmission.

Therefore, it is the primary object of the present invention to provide a tuning circuit which has two separate variable-capacity elements, one for the follow-up control of the phase locked loop and the other for modulation and shift corresponding to the intermediate frequency, arranged in parallel with an inductor of the oscillation circuit and adapted to be energized by a DC power supply through a change-over switch switchable every time when reception is changed to transmission and vice versa and which is very easy to adjust.

DETAILED DESCRIPTION

Figure 1:
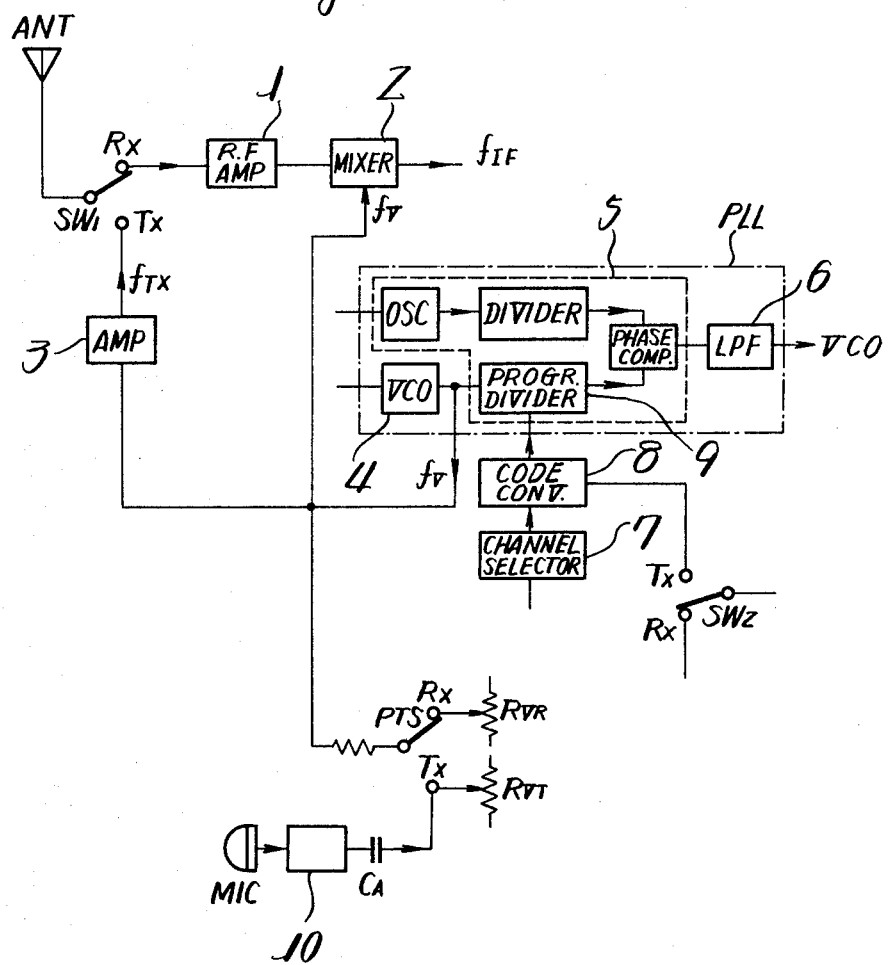
FIG. 1 is a block-connection diagram of a transmitter-receiver to which the present invention is applied.

Reference is now made to FIG. 1 which is a schematic block-connection diagram of a transmitter-receiver to which the present invention is applied.

An antenna (ANT) is connected to a receiving circuit through the receiving contact Rx of a transmission-and-reception change-over switch $SW_1$; the receiving circuit having a radio-frequency amplifier 1 and a mixer 2. The antenna (ANT) receives incoming modulated signals $F_{RX}$ which are fed to the receiving circuit where they are amplified and converted into intermediate frequency waves $f_{IF}$. On the other hand, a phase locked loop (PLL) is connected to the transmitting contact Tx of the change-over switch $SW_1$ through an amplifier 3. The controlled output frequency $f_v$ of a voltage-controlled oscillator 4 installed in the phase locked loop is adapted to apply to the mixer 2 of the receiving circuit as the local oscillation frequency. As is well known, the above-mentioned phase locked loop contains the foregoing oscillator 4, an essential section 5 consisting of a phase-comparison circuit where the reference frequency of a reference oscillator and the feedback frequency of the voltage-controlled oscillator 4 are divided and compared, and a low-pass filter 6.

Figure 2:
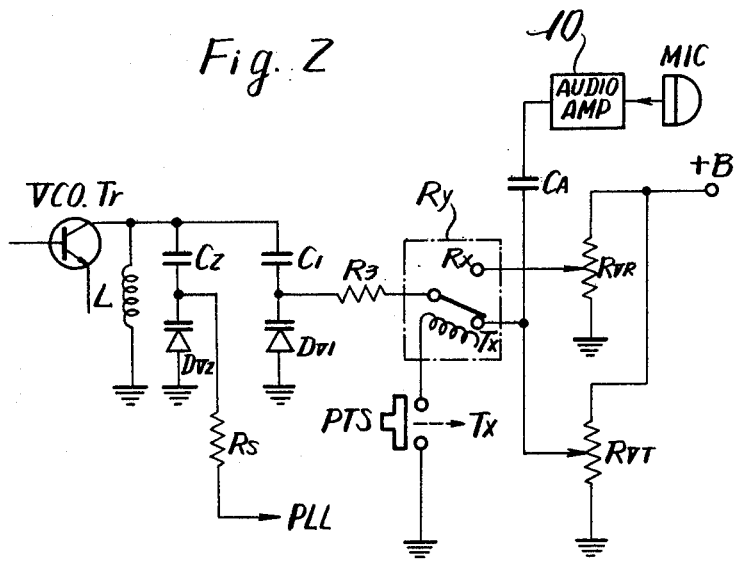
FIG. 2 is a connection diagram of an example of the tuning circuit according to the present invention.

In FIG. 2, $Dv_1$ designates a variable-capacity element connected through a press-to-talk switch (PTS) to variable-resistance means $R_{VR}$ and $R_{VT}$ which divide the voltage of DC power supply B. $Dv_2$ designates a variable-capacity element for use in the follow-up control of the phase locked loop (PLL). Detailed description of a tuning circuit using these two variable-capacity elements are as follows: When the press-to-talk switch (PTS) is closed, a change-over switch Ry (shown as an example of the switching means) is switched to its transmitting-side contact Tx, and thereby a divided voltage is taken out of the variable resistor $R_{VT}$ for transmission provided in parallel with the power supply B with which the variable resistor $R_{VR}$ for reception is also provided in parallel, and a voltage modulated with signals from a transmitting sound circuit is applied to the first variable-capacity element $Dv_1$ through a resistor $R_3$. During reception, the receiving-side contact Rx of the change-over switch Ry is closed and therefore a divided voltage of the DC supply B produced by the first variable resistor $R_{VR}$ independently of the second variable resistor $R_{VT}$ is applied to the first variable-capacity element $Dv_1$. The first and second variable-capacity elements $Dv_1$ and $Dv_2$ are both connected in parallel with an inductor L of an oscillation circuit connected to the collector of a transistor (VCO. Tr.) in the voltage-controlled oscillator 4. $C_1$ and $C_2$ designate tuning-and-filter condensers, respectively. Binary digit signals of a required number of bits, which are produced by the operation of a channel selector switch 7, are converted into those representing the number of steps of frequency division, which are fed to a variable frequency divider 9 of the phase locked loop (PLL) to give instructions as to frequency division thereto. The press-to-talk switch PTS is adapted to interlock with the change-over switches $SW_1$ and $SW_2$; therefore, when the press-to-talk switch PTS is switched from the receiving position to the transmitting position, the code converter 8 feeds the transmission code to the programmed variable frequency divider 9, and thus the PLL is operated on a voltage-controlled oscillation frequency different from that at the time of reception by the value equivalent to the intermediate frequency.

Figure 3:
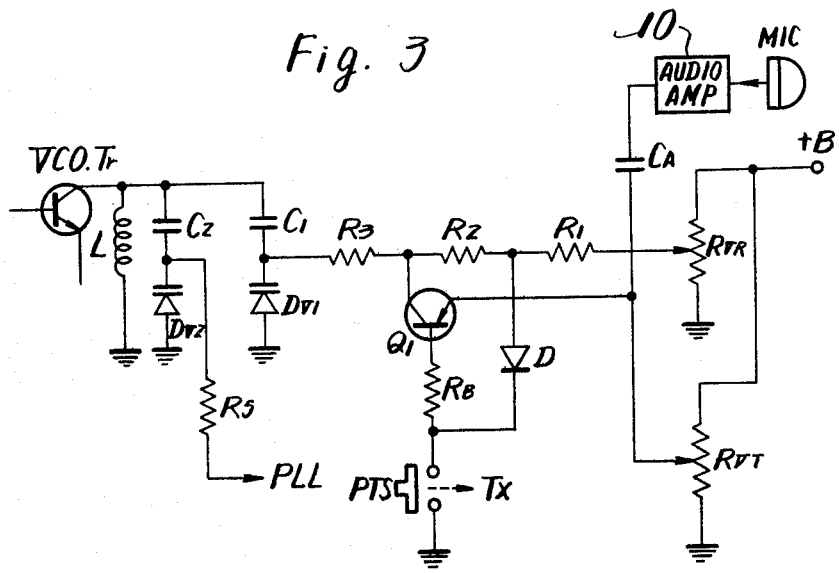
FIG. 3 is a connection diagram of another example of the tuning circuit according to the present invention.
Figure 4:
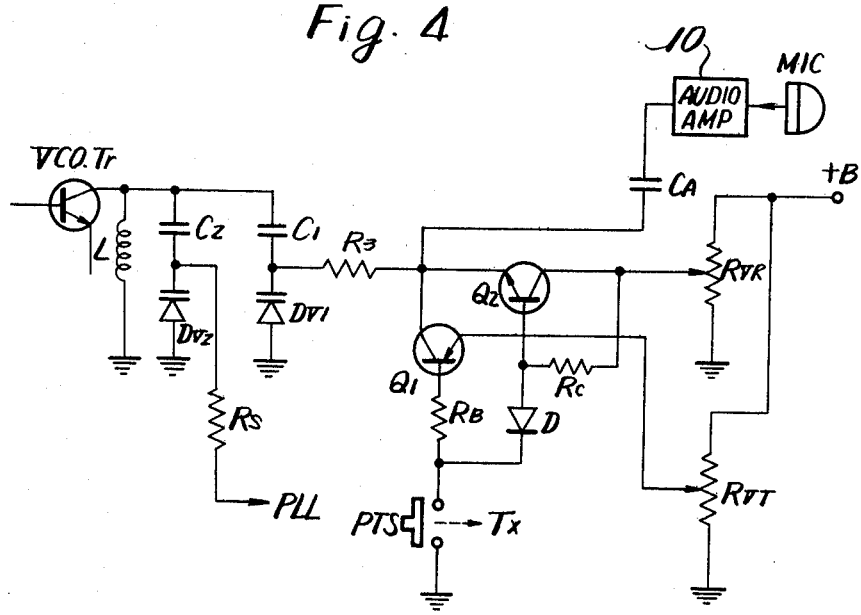
FIG. 4 is a connection diagram of still another example of the tuning circuit according to the present invention.

Next, reference is made to FIGS. 3 and 4 which show modifications of the tuning circuit according to the present invention having one transistor $Q_1$ and two transistors $Q_1$ and $Q_2$, respectively, as the switching means for obtaining a divided voltage from the first or second variable resistance $R_{VR}$ or $R_{VT}$ in cooperation with the press-to-talk switch. A diode D provided between the first variable resistor $R_{VR}$ and the press-to-talk switch PTS prevents the reverse flow of current. In FIG. 3, the press-to-talk switch PTS is opened as shown during reception and therefore the switching means, i.e., the transistor $Q_1$ is kept at the state of cut-off; thus a required DC voltage is applied to the first variable-capacity element $Dv_1$ through the first variable resistor $R_{VR}$ and resistors $R_1$, $R_2$ and $R_3$. When the press-to-talk switch PTS is closed to cause the transistor to conduct, the divided voltage obtained from the first variable resistor $R_{VR}$ becomes grounded through the diode D and, on the other hand, the divided voltage obtained from the second variable resistor $R_{VT}$ are modulated with the transmitting aural signals applied through a microphone MIC and an audio amplifier 10 and then is applied to the first variable-capacity element $Dv_1$ through the collector of the transistor $Q_1$ and the resistor $R_3$. FIG. 4 shows an example in which the resistors $R_1$ and $R_2$ in FIG. 3 are replaced by a variable-impedance element, i.e., a transistor $Q_2$. In this example, the transistor $Q_1$ is kept in the nonconducting state and $Q_2$ in the conducting state during reception, while the transistor $Q_1$ is kept in the conducting state and $Q_2$ in the nonconducting state during transmission; thus the divided voltage obtained from the first or second variable resistor $R_{VR}$ or $R_{VT}$ is applied to the first variable-capacity element $Dv_1$ during reception or transmission.

Figure 5:
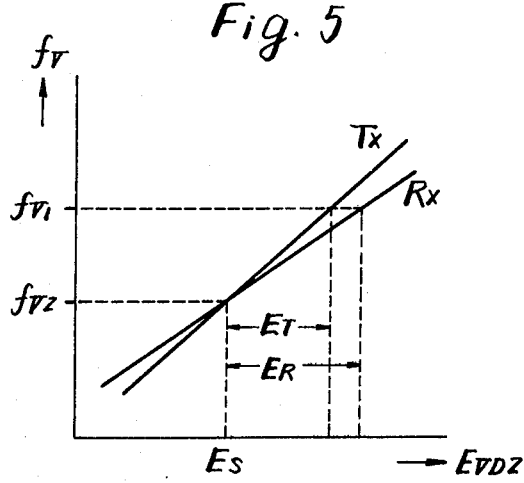
FIG. 5 is a graph showing the relationship between the DC voltage applied to the variable-capacity element for the follow-up control of the phase locked loop and the output frequency of the voltage-controlled oscillator.

Next, description will be made on the second variable-capacity element $Dv_2$ used for the follow-up control of the phase locked loop (PLL) with reference to FIG. 5. The gradient of the performance characteristics curve at the time of reception is inherently different from that at the time of transmission as shown. Accordingly, the voltage $E_{DV2}$ to be applied to the variable-capacity element $Dv_2$ in the range where the respective characteristics curves are linear and fall within the upper and lower limits of the controllable frequency range of the voltage-controlled oscillator 4 will be shifted only slightly from $E_R$ to $E_T$ when reception is switched to transmission if the intersection of the characteristics curves $Rx$ and $Tx$ is selected as the voltage Es corresponding to the start channel. For this reason, almost the same voltage may be applied to the linearly operating variable-capacity element $Dv_2$ continuously both in reception and transmission. The difference between the operating frequencies of the first and second variable-capacity elements $Dv_1$ and $Dv_2$ thus corresponds to the shift equivalent to the intermediate frequency, and previous adjustment of both frequencies by tracking will suffice for suitable operation.

According to the present invention, as mentioned above, two conventional variable-capacity elements, one for frequency shift and modulation and the other for precise follow-up control of the PLL, are provided in parallel with the inductor of the oscillation circuit, respectively; and DC voltages necessary for the respective variable-capacity elements are adapted to be applied through a switch operated interlocking with the press-to-talk switch. Accordingly, even if the tuning circuit of the present invention is applied to a system of a multi-channel transmitter-receiver used with high frequencies such as UHF and VHF which involves a shift corresponding to the intermediate frequency when the transmitter-receiver is switched from the receiving state to the transmitting state, the transmitter-receiver can be finely adjusted, after its tuning has been once set, by a simple manipulation of two sets of variable-resistance means outside its casing to obtain precise, rapid and stable tuning. Thus, according to the present invention, the transmitter-receiver of the intermediate frequency type used with high frequencies such as UHF and VHF can use conventional variable-capacity elements and, in addition, a large part of its phase locked loop containing a tuning section, voltage-controlled oscillator, etc., can be formed into an LSI configuration and, therefore, it can be made compact and inexpensive.

What is claimed as new and desired to be secured by letters Patent of the United States is:

1. In a transmitter-receiver having a receiving circuit for converting a received carrier frequency into an intermediate frequency by mixing it with a local oscillation frequency which is the controlled output frequency of a voltage-controlled oscillator of a phase locked loop, and a transmitting circuit connected to said receiving circuit through a transmission-and-reception change-over switch; the improvement which comprises a tuning circuit having first and second variable-capacity elements provided in parallel with an oscillation inductor of said voltage-controlled oscillator, said first element receiving a DC voltage corresponding to said intermediate frequency and simultaneously receiving a DC voltage necessary for frequency modulation using transmitting audio signals while interlocking with the switching action of a press-to-talk switch for reception and transmission, said second variable-capacity element receiving voltages ranging within the controllable limits of said voltage-controlled oscillator from said phase locked loop so that the follow-up control of said phase locked loop may be achieved, and DC power supply means for said first variable-capacity element including a first and a second variable-resistance means, means for connecting said first variable-resistance means across the terminals of an external DC power supply, means for connecting said second variable-resistance means across the terminals of the external DC power supply, and a switching means for selectively applying divided voltages produced by said first and second variable-resistance means to said first variable capacity element according to the position of said press-to-talk switch, whereby frequency phase synchronization is achieved by one phase locked loop.

2. The tuning circuit as set forth in claim 1, wherein the switching means includes a change-over switch connected to said first and second variable-resistance means and adapted to select either of said two variable-resistance means according to the position of said press-to-talk switch.

3. The tuning circuit as set forth in claim 1, wherein the switching means includes a transistor element provided in a circuit extending from said first and second variable-capacity elements to at least one of said first and second variable-resistance means and adapted to change its state of conduction according to the position of said press-to-talk switch.

* * * * *